US 9,852,194 B2

(12) United States Patent
Priestley et al.

(10) Patent No.: US 9,852,194 B2
(45) Date of Patent: Dec. 26, 2017

(54) USING USER-DEFINED CRITERIA TO IMPROVE PARTICIPATORY EVENT NOTIFICATION

(71) Applicants: Andy William Priestley, Dallas Center, IA (US); Matthew Morris Mann, Waukee, IA (US)

(72) Inventors: Andy William Priestley, Dallas Center, IA (US); Matthew Morris Mann, Waukee, IA (US)

(73) Assignee: Camp Marketing Services, LLC, Ames, IA (US)

( * ) Notice: Subject to any disclaimer, the term of this patent is extended or adjusted under 35 U.S.C. 154(b) by 210 days.

(21) Appl. No.: 14/645,118

(22) Filed: Mar. 11, 2015

(65) Prior Publication Data
US 2016/0267148 A1 Sep. 15, 2016

(51) Int. Cl.
G06F 17/30 (2006.01)
G06F 17/00 (2006.01)
G06F 3/0482 (2013.01)
H04W 68/00 (2009.01)
H04W 4/02 (2009.01)
H04L 29/08 (2006.01)
H04L 29/06 (2006.01)

(52) U.S. Cl.
CPC ...... *G06F 17/30554* (2013.01); *G06F 3/0482* (2013.01); *G06F 17/30867* (2013.01); *H04L 67/10* (2013.01); *H04L 67/20* (2013.01); *H04L 67/26* (2013.01); *H04L 67/42* (2013.01); *H04W 4/021* (2013.01); *H04W 68/00* (2013.01)

(58) Field of Classification Search
CPC .......... G06F 17/30598; G06F 11/3476; G06F 17/2785; G06F 17/30619; G06F 17/30705; G06F 17/30368; G06F 17/30477; G06F 17/30507; G06F 17/30525; G06F 17/30551; G06F 17/30604; G06F 17/30265; G06F 11/3006; G06F 11/3072; G06F 17/30289; G06F 17/30
See application file for complete search history.

(56) References Cited

U.S. PATENT DOCUMENTS

| 8,745,057 | B1 * | 6/2014 | Li | G06F 17/30247 707/737 |
| 2008/0120158 | A1 * | 5/2008 | Xiao | G06Q 10/06314 705/7.18 |
| 2012/0164997 | A1 * | 6/2012 | Iyer | G06Q 10/109 455/414.2 |
| 2012/0254764 | A1 * | 10/2012 | Ayloo | G06Q 30/02 715/738 |
| 2013/0110836 | A1 * | 5/2013 | Tomberg | G06Q 50/01 707/737 |

(Continued)

Primary Examiner — Yicun Wu
(74) Attorney, Agent, or Firm — Brett J. Trout

(57) ABSTRACT

A method for promulgating and searching a database of participatory events and providing search result alerts to users. Event organizers enter events into the system using various searchable criteria. A user may search the database or setup a customized search request that the system returns to the user as alerts at predetermined times or as new events are entered into the database. The system tags events stored in the database to facilitate the provision of user alerts based upon preselected user-determined criteria.

9 Claims, 11 Drawing Sheets

(56) References Cited

U.S. PATENT DOCUMENTS

2013/0151637 A1\* 6/2013 Bedikian .................. H04L 67/22
 709/206
2014/0095629 A1\* 4/2014 Brown ............... G06Q 10/1093
 709/206

\* cited by examiner

EVENT INFORMATION

EVENT NAME*
A DESCRIPTIVE TITLE FOR THE EVENT

EVENT START DATE*  END DATE*       EVENT TYPE*         ACTIVITY*
MM/DD/YYYY         MM/DD/YYYY      SELECT EVENT TYPE   SELECT ACTIVITY

PARTICIPANT GENDER(S)*
SELECT GENDER

PARTICIPANT AGE GRADE REQUIREMENT(S)*
SELECT REQUIRMENTS

EVENT DESCRIPTION

FIG. 3

ORGANIZER INFORMATION
EVENT ORGANIZER NAME* —90
DUKE
EVENT CONTACT NAME —92
COACH PRIESTLEY
EVENT CONTACT EMAIL —94
SUPPORT@WEBSITE
EVENT CONTACT PHONE —96
PHONE NUMBER

EVENT LOGO —98
LOGO
+ UPLOAD LOGO(S)

| EVENT LOCATION | | REGISTRATION INFORMATION | |
|---|---|---|---|
| EVENT LOCATION | | EVENT PRICE RANGE* —112 —114 | NEED A HINT? |
| NAME OF BUILDING OR EVENT CENTER —100 | | LOW PRICE | HIGH PRICE |
| COUNTRY* —102 | | EVENT WEBSITE LINK —116 | |
| SELECT COUNTRY  ˅ | | WEBSITE | |
| ADDRESS —104 | ADDRESS 2 | ONLINE REGISTRATION LINK —118 | |
| ADDRESS | | WEBSITE | |
| CITY —106 | | REGISTRATION START DATE —120 —122 | |
| | | MM/DD/YYYY 🗓 | 12:00 AM 🕐 |
| STATE* —109 ZIP CODE* —110 | | REGISTRATION END DATE —124 —126 | |
| SELECT A STATE ˅ | ZIP | MM/DD/YYYY 🗓 | 11:59 AM 🕐 |

LOGO  ADD ALERT  VIEW MY ALERTS  SEARCH EVENTS

LOGO

SOCCER EVENT FOR 13 YEAR OLDS
SOCCER CAMP - CITY SCHOOLS

EVENT DATES
DEC 16-18, 2014

LOCATION
CITY, STATE

⚠ REGISTRATION PERIOD
NOW UNTIL DEC 16, 2014 12:00 AM $ PRICE
$1,000 - $1,100

REGISTER

THIS EVENT IS FOR  BOYS & GIRLS  AGE  13

MORE INFORMATION

CITY HIGH SCHOOL
123 ROAD STREET
CITY, STATE ZIP

VISIT THE EVENT WEBSITE   CONTACT THE EVENT ORGANIZER

THIS IS THE EVENT DESCRIPTION.

FIG. 10

USING USER-DEFINED CRITERIA TO IMPROVE PARTICIPATORY EVENT NOTIFICATION

TECHNICAL FIELD

The following disclosure relates in general to push alerts for participatory sporting events and, more particularly, to improving such push alerts using user defined criteria to customize the alerts.

BACKGROUND OF THE INVENTION

Participatory sporting events, such as basketball or volleyball games, camps, leagues, etc. typically have one or more restrictions on the type of person allowed to participate in the event, such as only females, or only twelve year-olds. Similarly, potential participants often have their own criteria for participating in events, such as date of the event, location of the event, costs of the event, etc. As event organizers compete with one another for participants, it can be difficult to find a single source to simultaneously search multiple events, using user-defined criteria. It would therefore be desirable to provide a method to allow a participant to search participatory sporting events from several event organizers at once.

Typical search systems for participatory sporting events require participants to return to multiple individual websites over and over, to continuously search for updates regarding participatory sporting events. As such events can become sold out between the times a participant has visited multiple individual websites to perform a search, if a participant wants to ensure registration for a particular event prior to it being sold out, the participant must return to multiple individual websites numerous times to check for new events. It would therefore be desirable to provide an alert system whereby a participant is automatically alerted to new events matching the participants' pre-defined criteria.

As sporting events are often put on by several different event organizers, these event organizers can all have their own particular criteria associated with a particular event. As some event organizers assume that people searching for participatory sporting events on the event organizers webpage already know the requirements of the event organizer, some search criteria critical to a participant may be omitted all together by the event organizer. Additionally, while event organizers all list some information about a proposed sporting event, it would be desirable to provide a method for searching several participatory sporting events offered by several event organizers using a standard set of participant search criteria.

SUMMARY OF THE DISCLOSED SUBJECT MATTER

A method for storing and tagging a plurality of sporting events with various search criteria including event location, type of sport, and event date. The method allows the user to input several search parameters into a desired sporting event and the users contact information. The method involves performing a search on multiple sporting events using the user defined search parameters to obtain a set of search results which are then pushed to the user using the users contact information. The method produces an alert on the users device, which the user may use to view the search results and to obtain additional information about a desired sporting event. The user may run multiple searches on multiple participants simultaneously, receiving different alerts and different search results for each. The user may also change the desired search parameters for each participant by visiting a website associated with the search system.

BRIEF DESCRIPTION OF THE DRAWINGS

FIG. 3 is a display diagram showing a display of an event input screen;

FIG. 4 is a display diagram showing a display of an organizer information input screen;

FIG. 5 is a display diagram showing a display of an event location and registration information input screen;

FIG. 10 is a display diagram showing a display of event search results on a webpage.

DETAILED DESCRIPTION OF THE DRAWINGS

Figure 1:
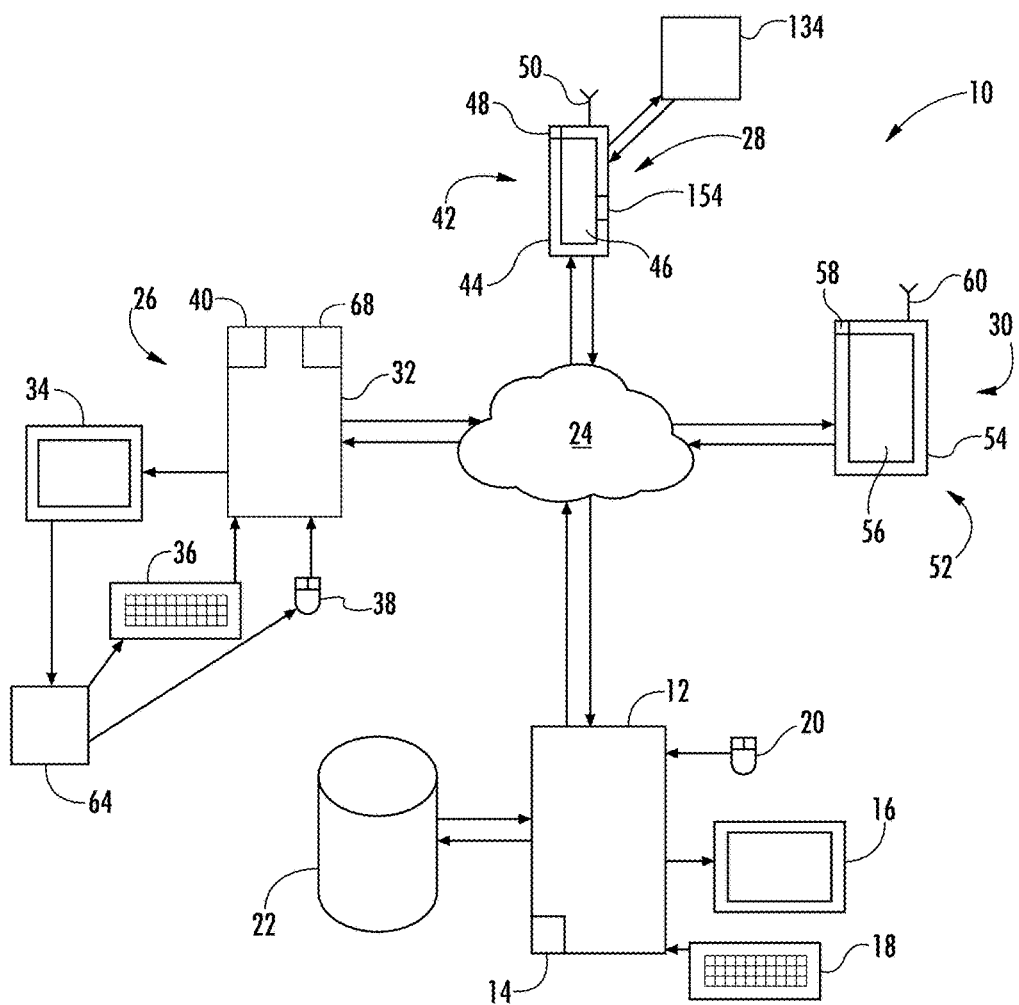
FIG. 1 is a component diagram of components included in a typical implementation of the system in the context of a typical operating environment.

FIG. 1 is a component diagram of components included in a typical implementation of the method of the present invention in the context of a typical operating environment. As illustrated, the operating environment includes a data processing system (10) that includes a computer acting as a server (12), and having memory (14) containing computer executable instructions for processing information. The server (12) is preferably provided with a display (16) and input devices, such as a keyboard (18) and mouse (20). The server (12) is coupled to a database (22) and a network (24). The server (12) is part of a client server model in a distributed application structure, communicating with various clients (26 28 and 30) over the network (24) that, in the preferred embodiment, is a global communications network such as the internet. The first client (26) is preferably a computer (32) coupled to a display (34), a keyboard (36), and a mouse (38). The computer (32) is provided with memory (40) such as that known in the art, containing computer executable instructions for processing information.

The client (28) is a mobile device (42) having a computer (44), a touch screen (46), and memory (48) containing computer executable instructions for processing information. The mobile device (42) may be a mobile phone or any device known in the art. The mobile device (42) is provided with an antennae (50), such as those known in the art to wirelessly communicate with the network (24). The client (30) is a tablet device (52) having a computer (54) a touch screen (56) and memory (58) containing computer executable instructions for processing information. The tablet device (52) is also provided with an antenna (60) to wirelessly connect to the network (24).

Figure 2A:
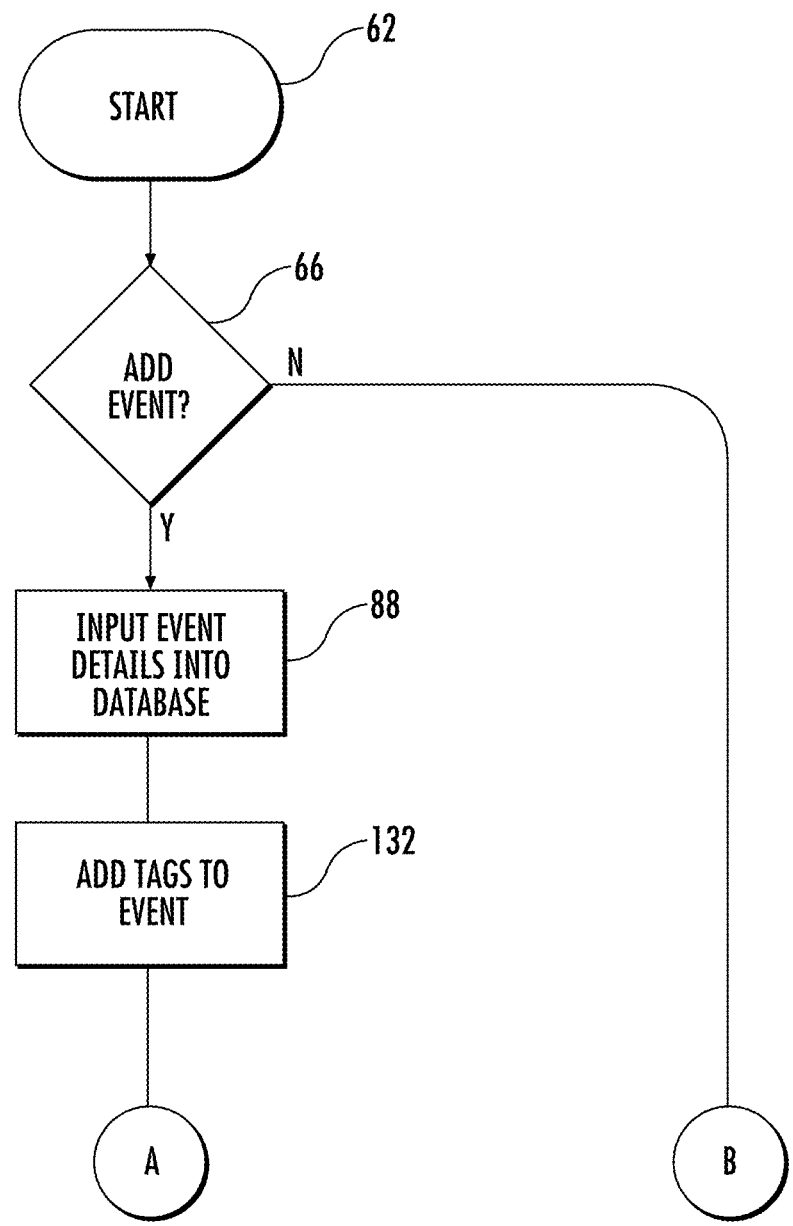
FIGS. 2A-B are a flow diagram showing steps typically performed by the system to allow an event organizer to post an event.
Figure 2B:
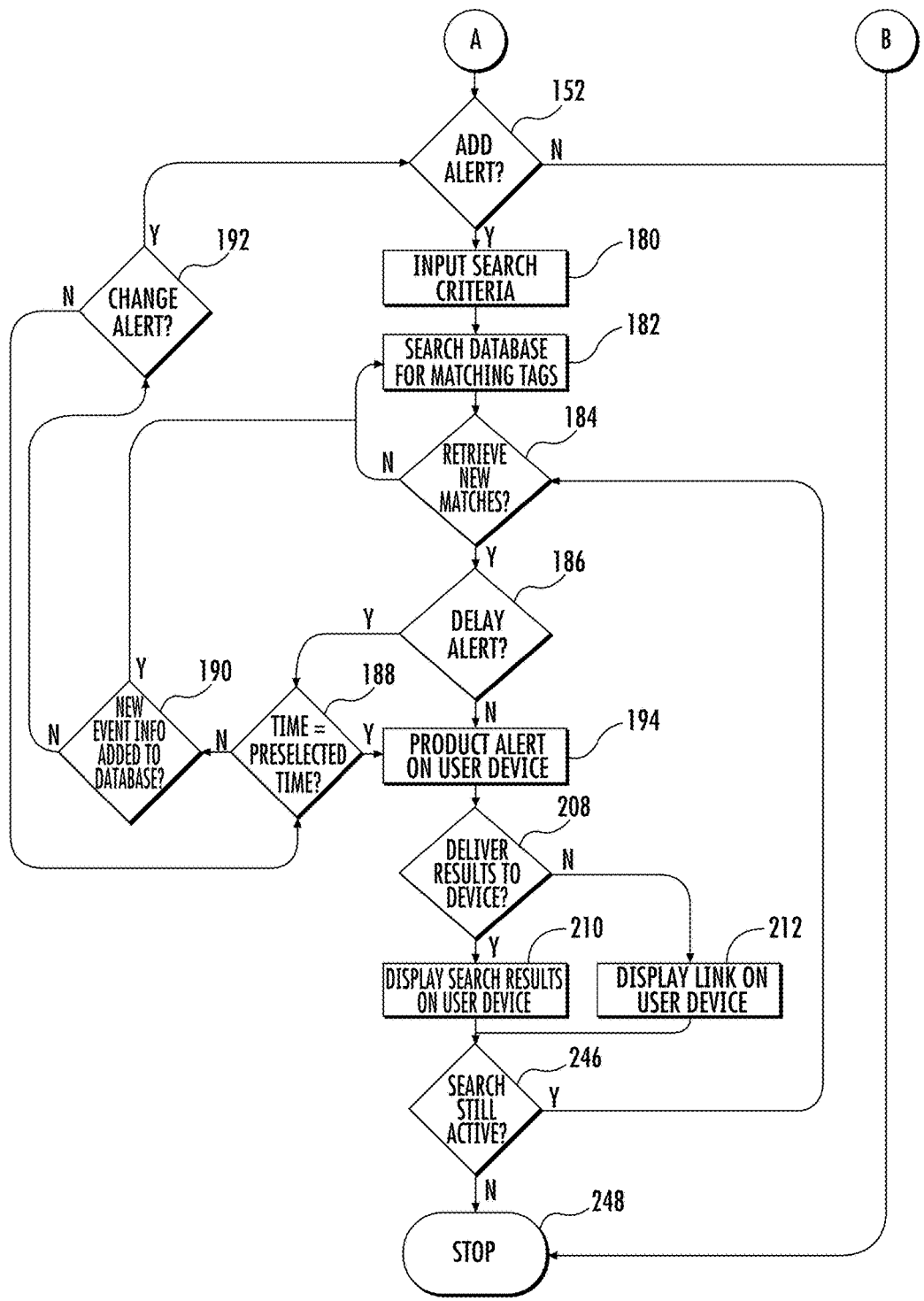

FIG. 2 is a flow diagram showing the steps typically performed by the system (10) for entering event information into the system (10) and sending alerts to users. The system

(10) starts (62) with an event organizer (64) adding (66) an event to the database (22). As shown in FIGS. 1-3, the event organizer inputs information through a device such as the keyboard (36) and/or a mouse (38) coupled to a computer (32), to instruct a browser (68) to pull up a webpage (70) stored on the server (12) via the network (24). The browser (68) displays the webpage (70) on the display (34). As shown in FIG. 3, the webpage (70) has a variety of fields, including an event name field (72) an event start date field (74) an event end date field (76) event type field (78) and activity field (80) a gender field (82) and a participant age/grade requirement field (84). The webpage (70) also includes an event description field (86) to allow an event organizer (64) to describe the event in greater detail. While the event organizer (64) may be of any type of event organizer known in the art, examples of event organizers include, but are not limited to, club sport organizers, camp organizers, league organizers, intramural team organizers, school event organizers, and any organizer seeking to organize an event. While in the preferred embodiment, the events are related to sporting events, such as basketball or volleyball games, camps, leagues, etc., if desired, the events may relate to environmental, academic, adventure, artistic, religious, or any other type of desired event.

Once the event organizer (64) pulls up the webpage (70), the event organizer (64) inputs (88) the appropriate event details into the fields (72-80) on the webpage (70). Similarly, the event organizers (64) enters event information into the event organizer name field (90), the event contact name field (92), the event contact e-mail field (94), the event contact phone field (96), and event logo field (98) also provided on the webpage (70). (FIG. 4) As shown in FIG. 5, the webpage (70) also includes an event location field (100), a country field (102), an address field (104), a city field (106), a state field (108), a zip code field (110), a low event price field (112), a high event price field (114), an event website link field (116), an online registration link field (118), a registration start date field (120), a registration start time field (122), a registration end date field (124), and registration end time field (126). The event organizer (64) also inputs (88) the appropriate event information into these fields (100-126) on the webpage (70).

Figure 6:
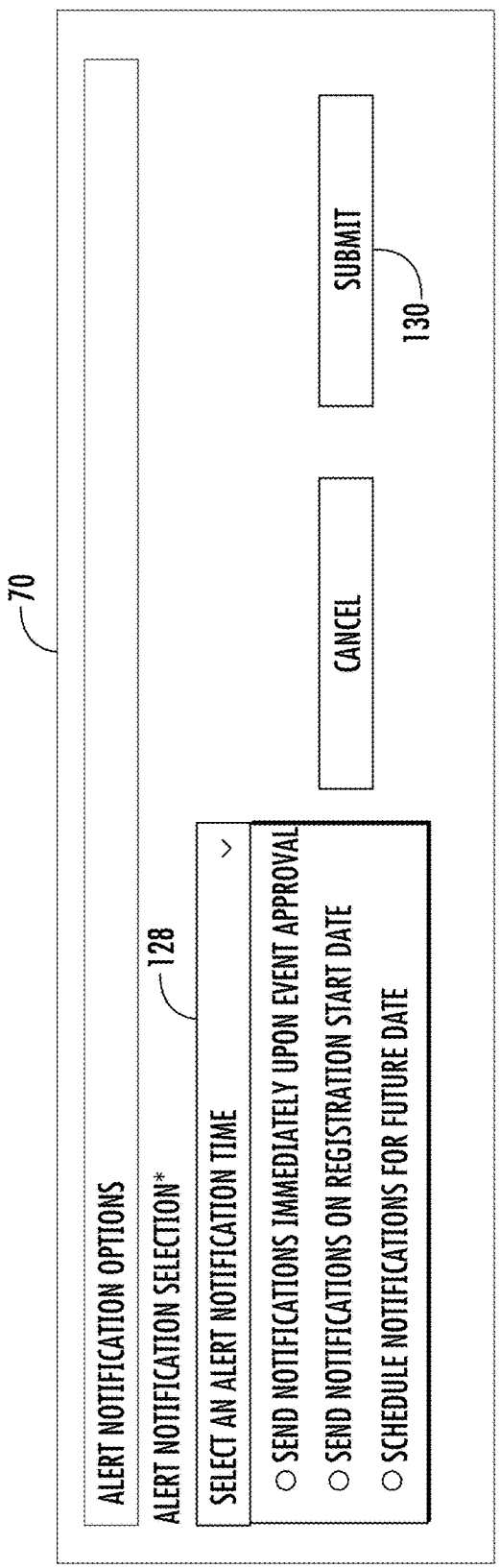
FIG. 6 is a display diagram showing a display of an event organizer alert notification selection screen.

As shown in FIG. 6, the webpage (70) also includes an alert notification selection pull down menu (128) that allows the event organizer (64) to select whether to send a notification regarding the event immediately upon approval on the registration date or at some future date. Some users may wish to receive notices immediately to allow for faster registration, while other users may wish to receive notifications only once per week, or once per month. Once the event organizer (64) has input (88) all the information onto the webpage (70) regarding the event, the event organizer (64) selects the submit button (130), thereby transmitting the information relating to the event via the network (24) to the server (12). Upon receipt of the event information, the server (12) tags (132) the information with suitable search tags and stores the information on the database (22). The tags may simply be the categories input by the event organizer (64), or may be more detailed or specific pre-determined tags the server (12) is programmed, based upon the content of that criteria, to attach to the criteria input by the event organizer (64). Additionally, if an event organizer (64) wishes to add different event types to the database (22), such as camps clinics tournaments or leagues, the system (10) may tag these events accordingly, allowing a user (134), as described more fully below, to execute searches and alerts using these search parameters as well.

In the preferred embodiment, the server (12) automatically tags the information. If desired, the event organizer (64) or a third-party, such as the owner of the system (10), may separately tag the information with various search criteria. Examples of tags that may be applied to the information to facilitate future search may include event location, participant age, activity type, event date, any of the other information provided in the fields (72-86) and (90-128) provided on the webpage (70), or any other desired search criteria. If desired, the event organizer (64) may revisit the webpage (70) to modify the event information as desired. In the preferred embodiment, the webpage (70) allows the event organizer (64) to set up an account having a unique username and password to allow the event organizer (64) to manage existing events, including updating events with changing activities, interests, locations, etc., and to add new events, while preventing undesired modification of event information by unauthorized third-parties.

Figure 7:
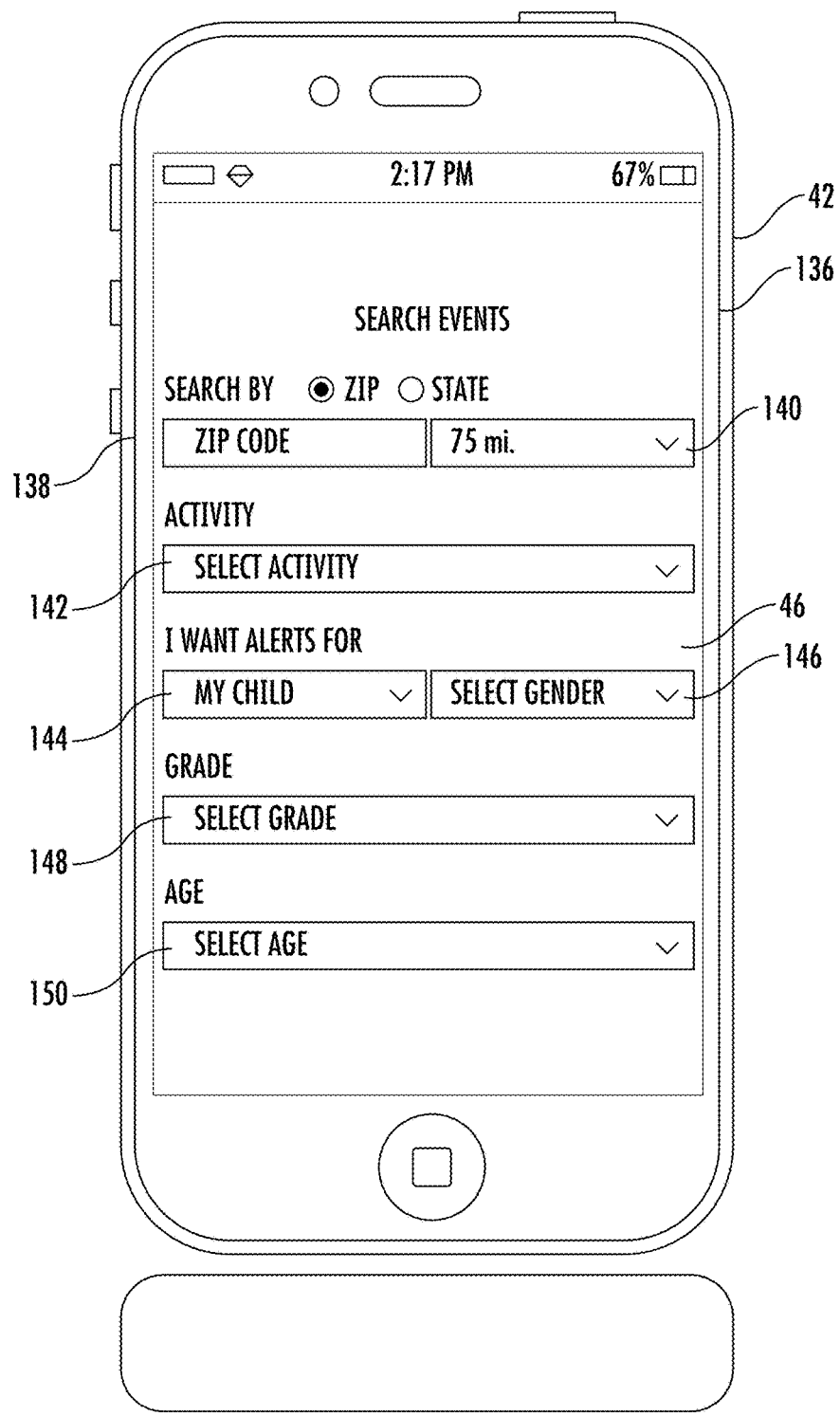
FIG. 7 is a display diagram showing a display of an event search screen.

When a user (134) wishes to find a desired event, the user (134) uses a device such as the mobile device (42) client (28) to pull up a webpage (136) from the server (12) via the network (24). As shown in FIG. 7, the webpage (136) is displayed on the touch screen (46) of the mobile device (42). The webpage (136) has several search fields, including a location search field (138), a distance pull down menu (140), an activity pull down menu (142), a participant pull down menu (144), a gender pull down menu (146), a grade pull down menu (148), and an age pull down menu (150). If desired, these pull down menus may be user-entered text fields, or any other method for receiving information. The participant pull down menu (144) allows a user (134) to conduct multiple searches for various potential event participants, such as themselves or their children. The search works in a conventional manner, whereby once the desired information is input into the fields (138-150) of the webpage (136) and submitted to the server (12) via the network (24), the server (12) pulls the information corresponding to the search request from the database (22) and provides the information via the network (24) to the mobile device (42) for display on the touch screen (46).

Figure 8:
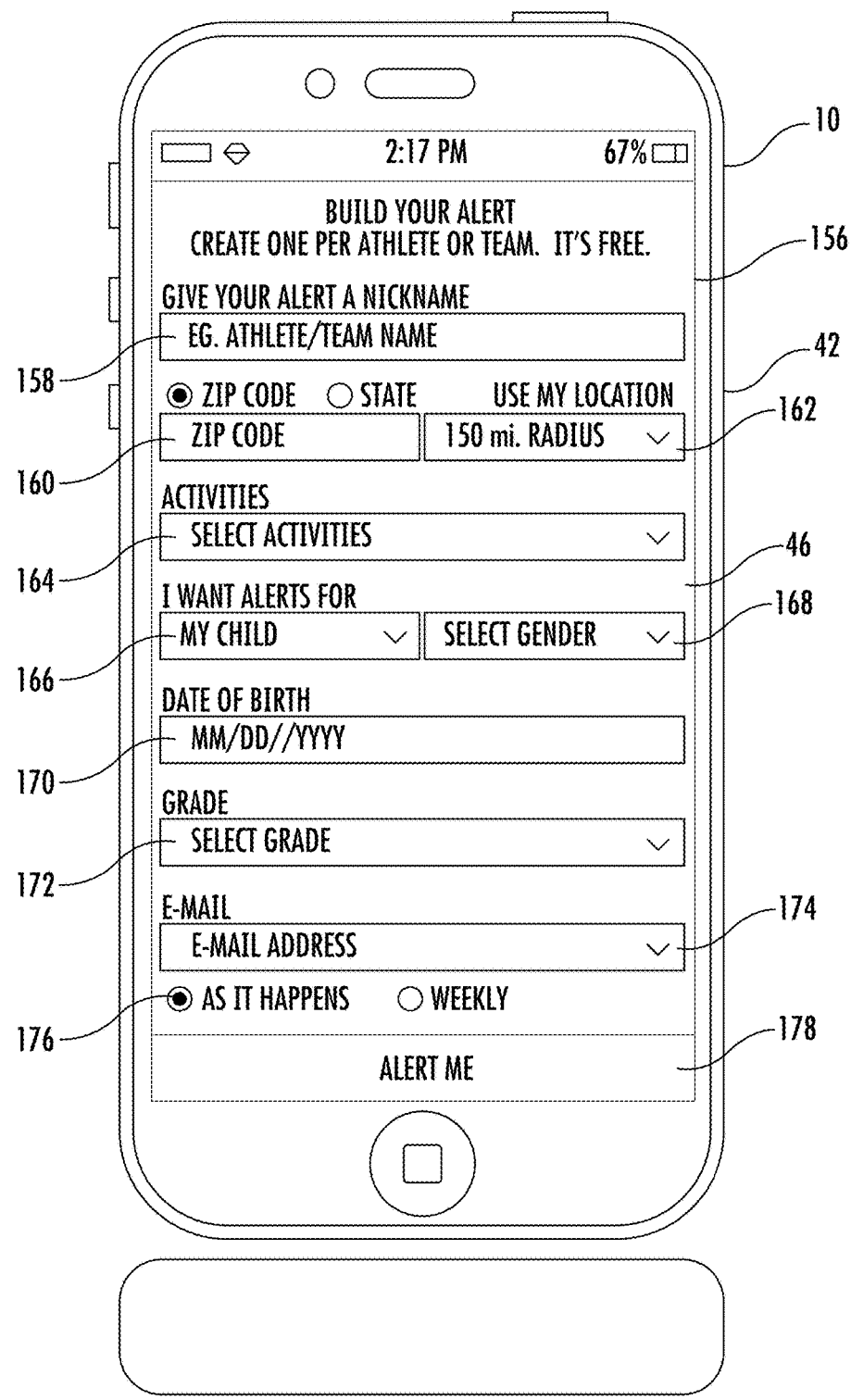
FIG. 8 is a display diagram showing a display of a user alert notification selection screen.

In addition to convention searching, the system (10) also allows a user (134) to add (152) alerts to provide the user (134) with search results for one or more potential event participants at some point in the future. As shown in FIGS. 1 and 8, when a user (134) desires to add (152) an alert, the user (134) uses a browser (154) on the mobile device (42) to pull up an alert webpage (156) on the touch screen (46) of the mobile device (42) from the server (12) via the network (24). As shown in FIG. 8, the alert webpage (156) is provided with a plurality of fields, including an alert nickname field (158), a location field (160), a distance pull down menu (162), an activity pull down menu (164), a participant pull down menu (166), a gender pull down menu (168), a date of birth field (170), a grade pull down menu (172), an e-mail address field (174), frequency selection boxes (176), and a submit button (178).

Once the user (134) has input (180) the desired information into the fields (158-176) on the webpage (156) and selected the submit button (178), the mobile device (42) transmits the user inputs over the network (24) to be received by the server (12). Once the server (12) has receives the user inputs associated with various search parameters, the server (12) searches (182) the database (22) using the various search parameters input by the user (134). The server (12) searches the database (22) using the tags added to the stored events as identified above in step (132). In the event the server (12) does not retrieve (184) any events with tags matching the user input search parameters, the process returns to step (182). The system (10) may either continue searching for new events immediately or at predetermined times for new events matching the user input search parameters. Alternatively, the system (10) may initiate future searches (182) only upon the addition or modification of event information entered into the database (22).

If the system (10) is successful in retrieving (184) a set of search results based upon the user input search parameters, the system (10) determines (186) whether the user (134) has requested a predetermined delay in the provision of the alert. Delays may be based upon the time of day the day of the week, the day of the month, the addition or modification of event information, or any other desired type of delay. In the event the user (134) has selected a delay, the system (10) determines (188) whether the current time equals the time pre-selected by the system (10), the event organizer (64) or, more typically the user (134), for delivery of the alert. If the time does not equal the pre-selected time, the system (10) determines (190) whether new event information has been added to the database (22). If the system (10) determines (190) that no new event information has been added to the database (22), the system (10) determines (192) whether any of the search parameters or any other aspect of the alert has changed. If none of the alert information has changed, the process returns to step (188).

In the event the system (10) determines (192) that information related to the alert has changed, the system (10) returns to step (152). Similarly, if the system (10) determines (190) that new event information has been added to the database (22), the process returns to step (182) to search the database (22) for new events with tags matching the user input search parameters. If the system (10) determines the user has not requested a delay on the provision of the alert or the system (10) has determined that the pre-selected time for delivery of the alert has arisen, the server (12) generates an alert and transmits the alert, via the network (24), to the mobile device (42) associated with the contact information previously input by the user (134). This transmission causes the mobile device (42) to produce (194) on the touch screen (46) an alert (196).

Figure 9:
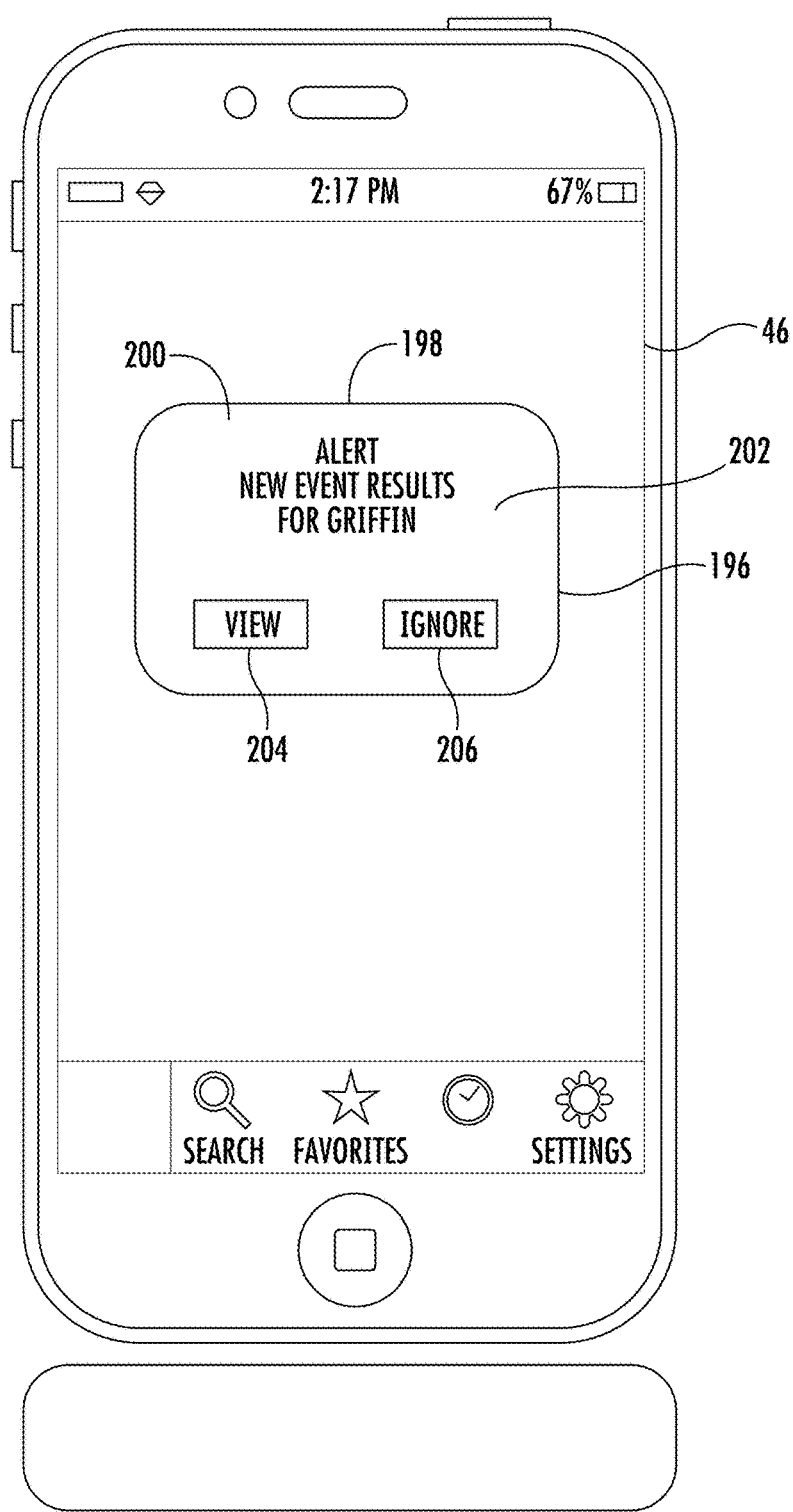
FIG. 9 is a display diagram showing a display of a push alert notification on a mobile device.

The alert (196) may be a push notification, an email, a text, a phone call, a voicemail message, an alert associated with an application, or any other know type of alert. While the alert (196) may be of any desired format, as shown in FIG. 9, the alert (196) includes either a default alert name or an alert nickname (198) selected by the user, information (200) relating to the contents of the alert, the name (202) of the participant previously input by the user (134) in the search request, a view button (204), and an ignore button (206). If the user (134) selects the ignore button (206), the alert (196) disappears from the touch screen (46) and the user (134) may retrieve the alert information at a later date. Alternatively, if the user (134) selects the view button (204) the system (10) determines (208) whether the system (10) is programmed, either by the event organizer (64), the owner of the system (10), a third-party, or more preferably the user (134), to either display (210) the results of the search on the mobile device (42) or to display (212) on the mobile device (42) a link to the search results.

When the user (134) selects the view button the system (10) determines (208) whether to display (210) the search results directly on the mobile device (42) or to display (212) a link to the search results on the mobile device (42). If the system (10) determines (208) to display (210) the search results directly on the mobile device (42), the system (10) displays (210) the search results directly on the touch screen (46) of the mobile device (42). If the system (10), instead or in addition to display (208) of the search results, determines (208) to display (212) a link to the search results on the mobile device (42), the system (10) displays (212) a link to the search results on the touch screen (46) of the mobile device (42). The user (134) may then select the link to obtain the search results. The link may be a Uniform Resource Locator to a webpage, a link to an application page, or any other type of link to any other linked source from which the search results may be retrieved. Once the user (134) selects the link, the search results are displayed on the touch screen (46).

Shown in FIG. 10 is a webpage (214) returned and displayed on the touch screen (46) of the mobile device (42) when the system (10) displays (212) a link on the mobile device (42) and the user (134) selects that link. The webpage (214) includes a navigation bar (216) allowing a user (134) to add alerts, view alerts, search events, or execute any additional desired actions. The webpage (214) also includes the event name (218) and the event logo (220). The webpage (214) shows the event dates (222), the event location (224), the registration dates and times (226), the price (228), the gender restrictions (230), the age restrictions (232), and a button (234) to obtain additional information, a registration button (236), the event address (238), the event description (240), an event website (242), and an event contact button (244). If the user (134) wishes to obtain more information about the particular event, the user (134) selects the more information button (234) that redirects the user (134) to a webpage or other location with additional information about the event. If the user (134) selects the registration button (236) the user (134) is directed to a website, a mobile application, or to another location that allows the user (134) to register for the event. If the user (134) wishes to visit the event website, the user (134) selects the event website button (242). Similarly, if the user (134) wishes to contact the event organizer, the user (134) selects the contact button (244). While the foregoing information is preferably presented in the format of a webpage (214), it will be understood by those with an ordinary skill in the art that the information may be similarly provided directly to the mobile device (42) via an application or via any other medium known in the art.

Once the search results have been delivered (208) to the user (134) the system (10) determines (246) whether the user's search request is still active. Some of the reasons a user's search request might no longer be active include restrictive date criteria provided by the user (134) the event organizer (64) or others, the user's request that the search request alert be cancelled, or any other desired reason. If the system (10) determines (246) that the alert request is still active the process returns to step (184), where the system (10) retrieves any new matches associated with the user's search request. If the system (10) determines (246) that the user's search request is no longer active, the process terminates (248).

In addition to creating a single alert, the system (10) also allows the user (134) to input additional participants into the participant pull down menu (166). A user (134) may enter a second participant, and a second set of associated search criteria into the system (10) in a manner such as that described above. The system (10) then uses this information to retrieve a second set of search results relating to the second participant, performing a search of events in the database (22) using the second set of search criteria. The system (10) generates a second alert and produces this second alert to the user (134) regarding the second participant. The user (134) may modify the second alert to have a different nickname, a different participant name, and/or any other desired additional attributes allowed by the system (10). As noted above, the system (10) may either display the second set of search results directly on a client associated with the user (134), or produce a link to the user (134) from which the second set of search results regarding the second participant may be retrieved. Similarly, the system (10) may allow the user (134) to enter any number of participants into the system (10), customizing the search criteria, the alerts, the timing of alerts, and the presentation of search results as desired. Examples of multiple participants associated with a single user (134) include a parent adding different alerts for each child, a coach adding alerts for players, teachers adding different alerts for students, etc.

If desired, an event organizer (64) may use the system (10) as a widget embedded on the event organizers website. The widget allows a user (134) to search events or create an alert specifically related to a particular event organizer directly from that event organizer's website. The widget may be customized for each event organizer (64) to add or remove event details, search fields, and alerts as appropriate. As an example if the event organizer (64) only organizes events related to roller derby, the activity type search field may be eliminated when the system (10) widget is embedded in that event organizer's website. Coaches may also use the system (10) to set up alerts to inform the coach of events of interest to the coach's team members such as tournaments, leagues, etc. Event facilities may also use the system (10) to target specific prospective event organizers and participants to better market the facilities to those groups.

Although a few implementations have been described in detail above, other modifications are possible. For example, while the system (10) is described above as relating to sports activities, the system (10) is also applicable to events related to academic, religious, adventure, and other non-sport participatory activities. In another example, the system (10) may be used to match users (134) with events such as math camps, tutoring classes, religious services, or the like. Furthermore, additional steps may be provided, or steps may be eliminated from the described flow, and other components may be added to, or removed from, the described systems. Accordingly, other implementations are within the scope of the following claims.

What is claimed is:

1. A computer implemented method for processing query information, comprising one or more computers and one or more storage devices storing instructions that are operable, when executed by the one or more computers, to cause the one or more computers to perform operations comprising:
   (a) generating a database having and event location data field type, a participant age data field type, an activity type data field type, and an event date data field type;
   (b) populating a first field of the event location data field type, on a data processing system with one or more processors, via one or more networks, with a first location associated with a first event to create a first populated field;
   (c) populating a second field of the participant age data field type, on the data processing system with one or more processors, via one or more networks, with a first participant age associated with the first event to create a second populated field;
   (d) populating a third field of the activity type data field type, on the data processing system with one or more processors, via one or more networks, with a first activity type associated with the first event to create a third populated field;
   (e) populating a fourth field of the event date data field type, on the data processing system with one or more processors, via one or more networks, with a first event date associated with the first event to create a fourth populated field;
   (f) populating a fifth field of the event location data field type, on the data processing system with one or more processors, via one or more networks, with a second location associated with a second event to create a fifth populated field;
   (g) populating a sixth field of the participant age data field type, on the data processing system with one or more processors, via one or more networks, with a second participant age associated with the second event to create a sixth populated field;
   (h) populating a seventh field of the activity type data field type, on the data processing system with one or more processors, via one or more networks, with a second activity type associated with the second event to create a seventh populated field;
   (i) populating an eighth field of the event date data field type, on the data processing system with one or more processors, via one or more networks, with a second event date associated with the second event to create an eighth populated field;
   (j) receiving from a first user, on the data processing system with one or more processors, a first user input associated with a first query parameter associated with an event location;
   (k) receiving from the first user, on the data processing system with one or more processors, a second user input associated with a second query parameter associated with a participant age;
   (l) receiving from the first user, on the data processing system with one or more processors, a third user input associated with a third query parameter associated with an activity type;
   (m) receiving from the first user, on the data processing system with one or more processors, a fourth user input associated with user contact information;
   (n) receiving from the first user, on the data processing system with one or more processors, first contact information associated with the first user;
   (o) retrieving at a first predetermined time, using the first user input, the second user input, and the third user input, a first set of query results from the database, that comprises information associated with the first event;
   (p) producing, on a display device associated with the first contact information, in response to retrieving the first set of query results, a first alert associated with information associated with the first set of query results;
   (q) displaying on the device the information associated with the first event;
   (r) retrieving, at a second predetermined time, using the first user input, the second user input, and the third user input, a second set of query results from the database, that comprises information associated with the second event;
   (s) producing, on the display device, in response to retrieving the second set of query results, a second alert associated with information associated with the second set of query results; and
   (t) displaying on the device the information associated with the second event.

2. The method of claim 1, wherein the first predetermined time and the second predetermined time are at least ten hours apart.

3. The method of claim 1, wherein the first predetermined time and the second predetermined time are at least seven days apart.

4. The method of claim 1, wherein the first alert comprises a textual component.

5. The method of claim 1, wherein the first alert comprises an audible component.

6. The method of claim 1, wherein the first alert comprises a vibratory component.

7. The method of claim 1, further comprising transmitting to the device, in response to retrieving the first set of search results, a link to a digital page associated with at least a portion of the first set of search results.

8. The method of claim 1, wherein the first location and the second location comprise events from two different states.

9. The method of claim 1, wherein the first activity type and the second activity type comprise events from two different sports.

\* \* \* \* \*